June 14, 1938.  V. J. ROPER  2,120,870
INCANDESCENT LAMP
Original Filed Nov. 18, 1931   3 Sheets-Sheet 1

Inventor:
Val J. Roper,
by Harry E. Dunham
His Attorney.

June 14, 1938.  V. J. ROPER  2,120,870
INCANDESCENT LAMP
Original Filed Nov. 18, 1931    3 Sheets-Sheet 2

Inventor:
Val J. Roper,
by Harry E. Dunham
His Attorney.

June 14, 1938. V. J. ROPER 2,120,870
INCANDESCENT LAMP
Original Filed Nov. 18, 1931 3 Sheets-Sheet 3
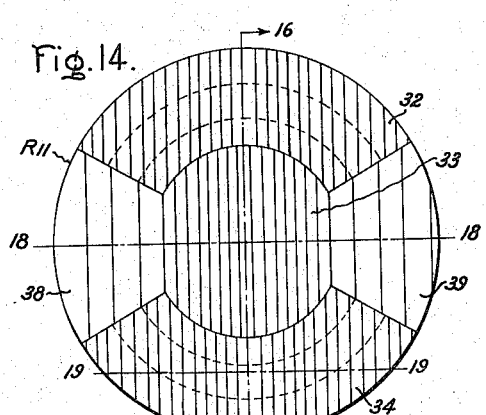
Fig. 14.
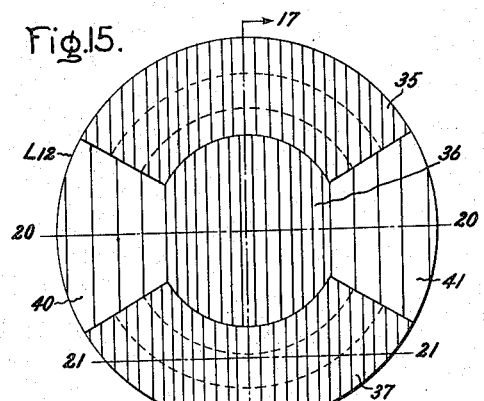
Fig. 15.
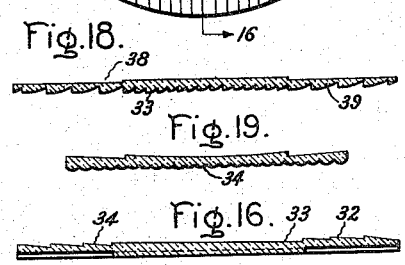
Fig. 18.
Fig. 19.
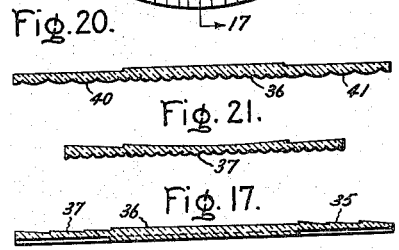
Fig. 20.
Fig. 21.
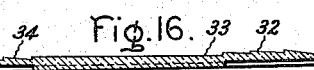
Fig. 16.
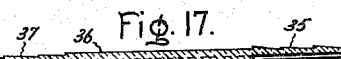
Fig. 17.
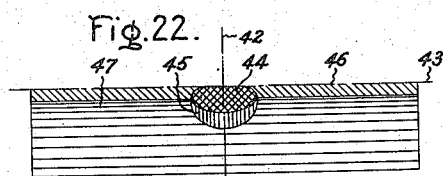
Fig. 22.
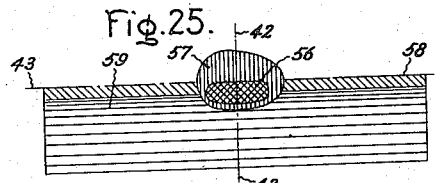
Fig. 25.
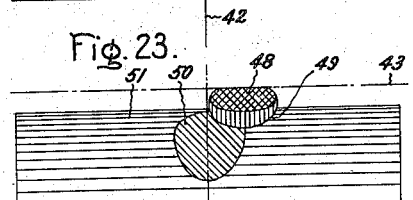
Fig. 23.
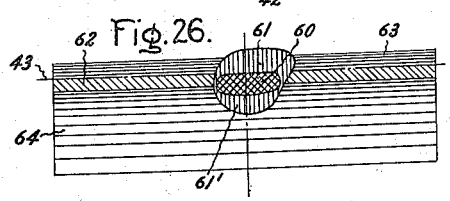
Fig. 26.
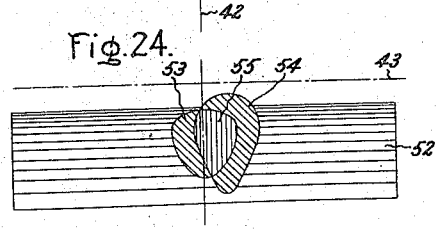
Fig. 24.
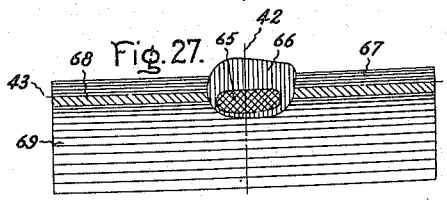
Fig. 27.
Inventor:
Val J. Roper,
by Harry E. Dunbar
His Attorney.

Patented June 14, 1938

2,120,870

UNITED STATES PATENT OFFICE 2,120,870

INCANDESCENT LAMP

Val J. Roper, Cleveland Heights, Ohio, assignor to General Electric Company, a corporation of New York Original application November 18, 1931, Serial No. 575,859. Divided and this application March 4, 1936, Serial No. 67,099. Renewed November 23, 1937

5 Claims. (Cl. 176—26)

My invention relates to multiple filament incandescent electric lamps and more particularly to projection lamps comprising a plurality of filaments. My invention is particularly applicable to vehicle headlights and the lamps used in connection therewith.

This application is a division of my application Serial No. 575,859, filed November 18, 1931, which discloses combinations of light sources, lenses, and reflectors which will produce various desirable road-illuminating beams. One of the objects of my invention is to provide lamps which, in combination with lenses or reflectors such as shown and described in my aforementioned application, will produce an asymmetric beam providing illumination along the right side of the road for use when approaching another vehicle, free from glare in the direction of the driver of said vehicle, but providing enough illumination to reveal the boundaries of the road as well as pedestrians or obstacles on the road itself, and from the same equipment a main driving beam for the open road which is substantially symmetric laterally. Another object of my invention is to provide a lamp which will produce in addition to these two beams another beam from the same equipment in which substantially all light is directed below the horizontal. Another object is to so shape and arrange the filaments as to obtain good control over the beams produced thereby. Other features and advantages of my invention will appear from the following description of species thereof and from the drawings.

Figure 1:
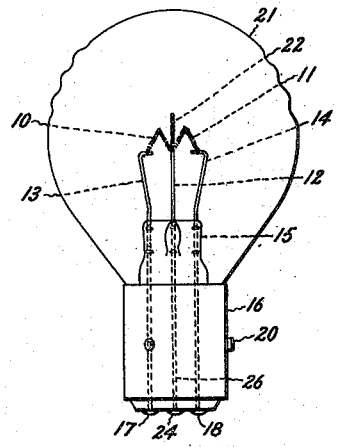
Figure 2:
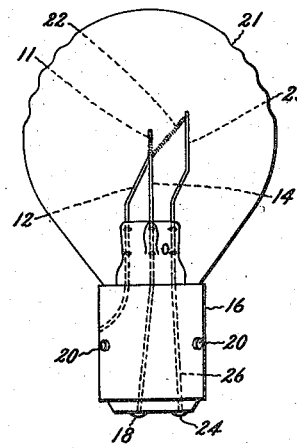
Figure 3:
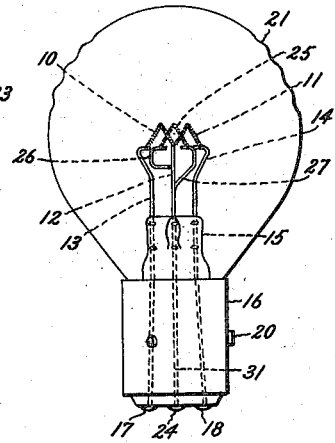
Figure 4:
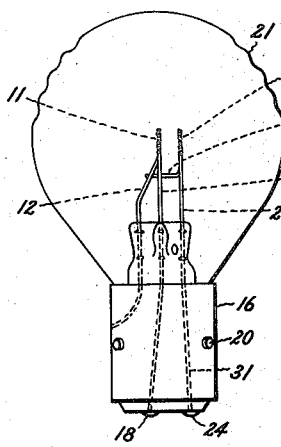
Figure 5:
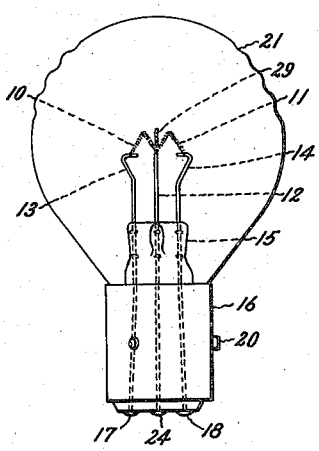
Figure 6:
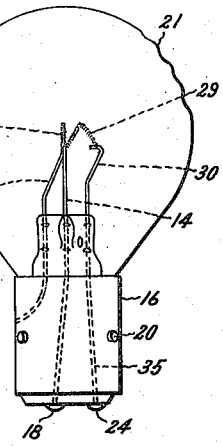

In the drawings Figs. 1 and 2 are elevations, taken 90° apart, of a lamp comprising my invention; Figs. 3 and 4 are similar elevations of a modification thereof; and Figs. 5 and 6 are similar elevations of another modification; Figs. 7 to 13 inclusive are diagrammatic views showing the locations of the light sources in the reflectors as seen through the reflector from the driver's seat; Fig. 14 is a front view of the right headlamp lens; Fig. 15 is a similar view of the left headlamp lens; Fig. 16 is a vertical section along line 16—16 of Fig. 14; Fig. 17 is a similar section along line 17—17 of Fig. 15; Figs. 18 and 19 are horizontal sections along lines 18—18 and 19—19 respectively of Fig. 14; Figs. 20 and 21 are similar sections along lines 20—20 and 21—21 respectively of Fig. 15; Fig. 22 is a diagrammatic illustration of the driving beam pattern produced by the arrangement in either Fig. 7 or 8; Figs. 23 and 24 are similar views of the passing and city beam patterns respectively and are produced by all the arrangements illustrated in Figs. 7 to 13 inclusive; and Figs. 25, 26 and 27 are views of driving beam patterns resulting from the arrangements shown in Figs. 9 or 12, 10, and 11 or 13 respectively.

Referring to Figs. 1 to 6, the lamps comprise a bulb 21, and a base 16, with positioning means such as pins 20 mounted thereon to locate the lamps in the sockets of the reflectors. A pair of filaments 10, 11, preferably V-shaped, are located side by side on opposite sides of the bulb axis and in a plane which passes through the said bulb axis. Said filaments 10, 11 extend laterally outward from the bulb axis and have the inner end of each connected to one end of a common lead wire 12 so that the two filaments together form a W. The other ends of filaments 10, 11 are mounted on the ends of lead wires 13 and 14 respectively which, together with lead 12, have portions sealed in the stem 15 and are attached to portions of the base.

In the lamp shown in Figs. 1 and 2, a third rectilinear filament 22 is located out of the bulb axis in a plane which passes through the said bulb axis perpendicularly to the plane of filaments 10, 11 and is forwardly inclined at an angle of approximately 45° to said plane of filaments 10, 11. The said filament 22 is located directly to the side of filaments 10, 11 so as to be directly above the focal point of the headlight reflector when the lamp is mounted therein. One end of said filament 22 is mounted on the end of the common lead 12 and the other end is mounted on the end of a lead wire 23. In Figs. 1 to 6 inclusive the common lead 12 is connected to the base shell 16, and the leads 13, 14 are connected to contacts 17, 18 respectively in the base. In Figs. 1 and 2 the lead wire 23 is connected to a contact 24 in the base.

The lamp shown in Figs. 3 and 4 is similar to that in Figs. 1 and 2 except that in place of filament 22 in the latter, the former has a V-shaped filament 25 located in a plane parallel to the plane of filaments 10, 11 and spaced a small distance therefrom, the vertex of said filament 25 being located midway between the vertices of filaments 10, 11 and at the same distance from the base or from the end of the bulb. In other words, the said filament 25 is symmetrically disposed about a plane perpendicular to the plane passing through filaments 10, 11 so that said filament 25 is located directly above the focal point of the reflector when the lamp is mounted therein. One leg of said filament 25 is connected by a lead and support wire 26 to the common lead wire 12 and the other leg is connected to a lead wire 27, the other end of which is connected to the contact 24 in the base.

The lamp shown in Figs. 5 and 6 comprises, in place of filament 22 of Fig. 1 and filament 25 of Fig. 3, a V-shaped filament 29 located directly to the side of filaments 10, 11 and in a plane perpendicular to the plane of said filaments of substantially the same size as said filaments, and at the same distance from the base or from the end of the bulb. One leg of filament 29 is connected to the end of the common lead wire 12 and the other leg is connected to the end of a lead wire 30 the other end of which is connected to the contact 24 in the base.

It will be apparent from the drawing that in each lamp, the filaments 10, 11 are located on opposite sides of the bulb axis and closely adjacent said axis while the third filament (22, 25 or 29) is located out of said axis but close thereto and is disposed symmetrically about a plane passing through said bulb axis at right angles to the plane of said filaments 10, 11. Therefore when the lamps are placed in the headlight reflector, all three filaments will be located close to the focal point thereof, thereby providing for good control over the beams projected from the headlight.

These lamps (Figs. 1–6) may be used interchangeably in various set-ups with good results but will produce particularly desirable results when used in the ways diagrammatically illustrated in Figs. 7 to 13 inclusive. These figures represent views of a pair of reflectors looking from the driver's seat of the vehicle and illustrate diagrammatically the position of the filaments. In each case the lens shown in Fig. 14 must be placed in front of the right reflector, and the lens shown in Fig. 15 in front of the left reflector to produce the light beams as they are illustrated. The terms right and left designate the headlamps as viewed from the driver's seat. These lenses differ only in the direction and amount of their horizontal light spreading capabilities. Areas 32, 33, 34, and 35, 36, 37, as shown in Figs. 16 and 17, are covered with prisms which bend the light down, and areas 38, 39, and 40, 41 have no downward bending prisms. The prisms in areas 32, 34, and 35, 37 are preferably progressive in design while the prism or prisms in areas 33 and 36 need not be progressive because their bending action is slight. By "progressive" design I mean that the surface of the prism is curved instead of plane to form a combination prism and lens which provides a progressive increase in the angle of bending and which in addition to bending the light, also spreads it, thus producing a smooth beam. These prisms direct the light in substantially only the vertical direction and may be incorporated in one face of the lens, as shown, or in the so-called horizontal spreading flutes on the other surface thereof.

The spreading flutes in the right lens R 11 (Figs. 14, 18 and 19) comprise half flutes with a spreading action of about 6° which are disposed over areas 38, 39 and 33 and which throw the light to the right from the driver's seat, and full flutes with a spreading action of about 20° which are disposed over areas 32 and 34. Areas 38, 39 and 33 may comprise sideward bending prisms instead of half flutes, or sideward bending prisms in combination with half flutes. The left lens L 12 (Figs. 15, 20 and 21) has full flutes with a spreading action of preferably 6° to 8° which are disposed over areas 40 and 41, and full flutes with a spreading action of 30° to 40° which are disposed over areas 35, 36 and 37. Other methods of dividing the lens area into sections can very easily be devised, and other lens designs for use with reflectors having both the spreading and/or bending characteristics can be used, so I do not wish to limit myself strictly to this design. I am also aware that the lenses can be placed in the opposite reflectors without changing the beam pattern if the filaments are arranged accordingly. The headlamps used in my invention comprise a pair of parabolic or modified parabolic reflectors in which are used any of the incandescent lamps shown in Figs. 1–6.

Figure 7:
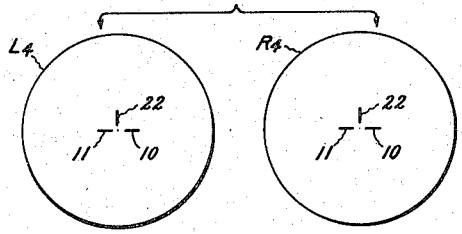

One position of the filaments within the reflector which gives satisfactory light beams with the lamp shown in Fig. 1 is illustrated in Fig. 7. With this arrangement all the filaments are at a compromise focus, that is, all filaments are substantially equidistant from the focal point of the reflector. In this disclosure the focal point of the modified reflector is considered as the point at which a filament used in combination with a suitable lens produces the same results as a filament at the focal point of a parabolic reflector. By a modified reflector I mean a parabolic reflector modified by changing the contour of portions thereof so as to deflect light downwardly and/or spread the light laterally, to perform the function of the usual prismatic and fluted lenses placed in front of the common unmodified parabolic reflector. Three patterns resulting from this arrangement, which I have found to be particularly desirable, are shown in Figs. 22, 23 and 24. The beam patterns are shown as they appear from the driver's seat when thrown upon a screen. The various areas represented are not necessarily of a given intensity or of even intensity, as hereinafter explained. The first pattern shown in Fig. 22 represents what might be called a driving beam and is produced by using filaments 10 and/or 11 in the headlamp using the lens shown in Fig. 15, which in this case is the left headlamp L 4, and filament 10 in the other headlamp R 4 (Fig. 7). The beam pattern produced is characterized by a so-called "hot spot" 44 of substantially oval cross-section, located at the center (line 42) and just below horizontal (line 43), a smaller area 45 of less intensity directly below the first, a narrow band 46 of still less intensity just below horizontal extending to the limits of the beam, and another band of light 47 just below the band 46, running the full width of the beam and decreasing in strength below the horizontal. The hot spot 44 is produced by lens areas 40—41 of Fig. 15 with filaments 10 and/or 11. The pattern area 45 is produced by lens areas 33—38—39 of Fig. 14 with filament 10. The band 46 is produced by lens area 36 of Fig. 15 with filaments 10 and/or 11. The band 47 is produced by lens areas 33—34 of Fig. 14 with filament 10 and lens areas 35—37 of Fig. 15 with filaments 10 and/or 11. The pattern shown in Fig. 23 may be referred to as a passing beam since some of the light is thrown to the right of center and the rest is depressed below the horizontal (line 43). Essentially this beam pattern is obtained by any of the set-ups shown in Figs. 7 to 13. The characteristics of this beam are a "hot spot" 48 of substantially oval cross-section located to the right of center and just below the horizontal, a smaller area 49 of less intensity below the area 48, a shield-shaped area 50 of still less intensity directly in the center and a few degrees below horizontal, and another band 51 running the full width of the beam and decreasing in strength below the horizontal. This beam is produced by operating filament 11 in the right headlamp R 4 (Fig. 7) and filament 22 in the left headlamp L 4. The hot spots 48—49 are produced by lens areas 33—38—39 of Fig. 14 with filament 11. The pattern area 50 is produced by lens areas 40—41 of Fig. 15 with filament 22. The band 51 is produced by lens areas 35—36—37 of Fig. 15 with filament 22 and lens areas 32—34 of Fig. 14 with filament 11.

The third pattern of the combination which may be used during city driving is shown in Fig. 24 and is produced by the use of filaments 22 in each headlamp. The light in this case consists of a large band 52 which covers the full width of the beam and is several degrees below horizontal, and a shield-shaped area 53 and an apioidal area 54 of approximately equal intensity. Since the area 53 is on center and just below horizontal, and the area 54 is just to the right of center and below horizontal, they overlap to form a third area, 55, of greater intensity. The pattern area 53 is produced by lens areas 40—41 of Fig. 15 with filament 22. The area 54 is produced by lens areas 33—38—39 of Fig. 14 with filament 22. The band 52 is produced by lens areas 35—36—37 of Fig. 15 with filament 22 and lens areas 32—34 of Fig. 14 with filament 22. This beam pattern represents substantially the city beams of all the arrangements shown in Figs. 7 to 13.

Figure 8:
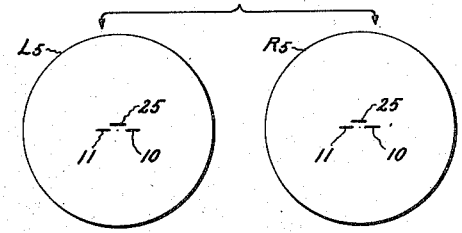

A somewhat similar arrangement appears in Fig. 8 which illustrates the arrangement using the lamp of Fig. 3. In this lamp the third filament 22 of Fig. 1 is replaced by a filament 25 of different design which does not alter the beam design appreciably. It will therefore be noted that this lamp may be substituted for the other in each of the arrangements in Figs. 7 to 13 with good results, providing filaments 10 and 11 are in the same position in each instance. In actual practice this lamp is perhaps to be preferred although due to lower manufacturing costs, the former lamp may be considered more important.

Figure 9:
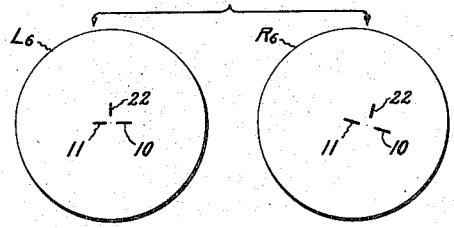

Another arrangement of the filaments that gives very desirable characteristics is shown in Fig. 9. In this arrangement the lamp in the right headlamp R 6 is so placed that filament 11 is in the focal point of the reflector, and filament 10 is to the right and below the focal point. With this set-up the passing and city beams are substantially the same as before, but the driving beam pattern is like that shown in Fig. 25. The characteristics of this beam are a "hot spot" 56 of substantially oval cross-section, located at the center and just below horizontal, another larger and roughly oval "hot spot" 57 of less intensity in the center and above and below substantially horizontal, a narrow band 58 of still less intensity just below horizontal running the full width of the beam, and another band 59 also running the full width of the beam and decreasing in strength below the horizontal. The hot spot 56 is produced by lens areas 40—41 of Fig. 15 with filaments 10 and/or 11. The second hot spot 57 is produced by lens areas 33—38—39 of Fig. 14 with filament 10. The band 58 is produced by lens area 36 of Fig. 15 with filaments 10 and/or 11. The band 59 is produced by lens areas 35—37 of Fig. 15 with filaments 10 and/or 11 and lens areas 32—34 of Fig. 14 with filament 10.

Figure 10:
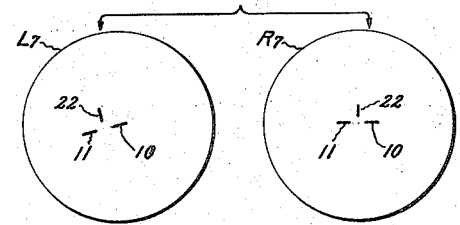

Perhaps the most preferable arrangement is that shown in Fig. 10. The left headlamp L 7 has filament 10 at the focal point of the reflector, and filament 11 to the left and below the focal point. The lamps may be identical, that in the left unit being rotated to provide the position indicated in Fig. 10. The right headlamp R 7 has filaments 10 and 11 in a horizontal plane and equidistant from the focal point. With this arrangement four beams may be produced. First, a driving beam shown in Fig. 26, is obtained by using filaments 10 and 11 (Fig. 10) in the left headlamp L 7, and filament 10 in the right headlamp R 7. Then, a passing beam substantially as shown in Fig. 23 is obtained by using filament 22 in the left headlamp and filament 11 in the right headlamp, and a city beam, which is of substantially the pattern shown in Fig. 24, is obtained by the use of filament 22 in each lamp. Still another beam, chiefly used for focusing and aiming the headlamps, uses filament 10 in each headlamp giving substantially the pattern shown in Fig. 26 with areas 61 and 63 removed. This latter beam may also be used as a driving beam in suburban districts and also as a driving beam in the country when no light above the horizontal is needed or desired. The driving beam pattern (Fig. 26) is characterized by a "hot spot" 60 of substantially oval cross-section located at the center and just below horizontal, another "hot spot" 61 of less intensity extending above and below horizontal, a third hot spot 61' below horizontal, a narrow band 62 of still less intensity just below horizontal and running the full width of the beam, a narrow band 63 above horizontal and also running the full width of the beam, and a wide band 64 also running the full width of the beam and decreasing in strength below the horizontal. The hot spot 60 is produced by lens areas 40—41 of Fig. 15 with filament 10. The second hot spot 61 is produced by lens areas 40—41 of Fig. 15 with filament 11. The third hot spot 61' is produced by lens areas 33—38—39 of Fig. 14 with filament 10. The band 62 is produced by lens area 36 of Fig. 15 with filament 10 and the band 63 is produced by the same lens area with filament 14. The band 64 is produced by lens areas 35—37 of Fig. 15 with filament 10—11 and lens areas 32—34 of Fig. 14 with filament 10.

Figure 11:
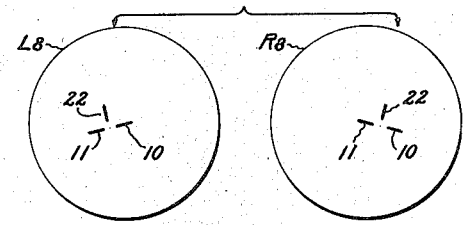

By slanting the lamps in both headlamps, as shown in Fig. 11, another arrangement is obtained which provides passing and city beam patterns substantially the same as in the first case, but a driving beam pattern as shown in Fig. 27. Said pattern of Fig. 27 is characterized by "hot spot" 65 of substantially oval cross-section just below horizontal and at the center, a larger "hot spot" 66 of less intensity above and below horizontal and substantially at the center, a narrow band 67 of less intensity above horizontal running the full width of the beam, a narrow band 68 just below horizontal of slightly more intensity than the band 67 but of less intensity than either of the hot spots, running the full width of the beam, and another band 69 the full width of the beam, having an intensity at the top approximately that of the band 67 and decreasing in strength below the horizontal. The hot spot 65 is produced by lens areas 40—41 of Fig. 15 with filament 10. The second hot spot 66 is produced by lens areas 40—41 of Fig. 15 with filament 11 and lens areas 33—38—39 of Fig. 14 with filament 10. The band 67 is produced by area 36 of Fig. 15 with filament 11, and the band 68 is produced by the same lens area with filament 10. The band 69 is produced by lens areas 35—37 of Fig. 15 with filaments 10 and 11 and lens areas 32—34 of Fig. 14 with filament 10.

Figure 12:
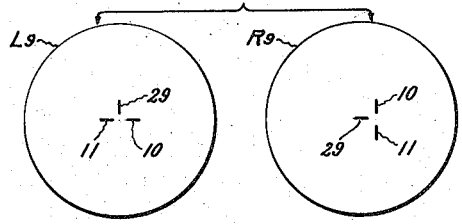
Figure 13:
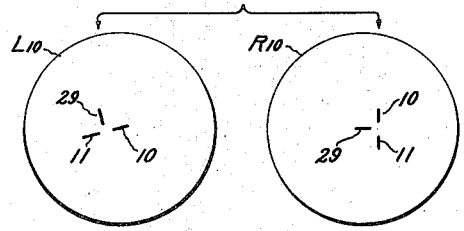

The arrangements shown in Figs. 12 and 13 are particularly adapted for the lamp shown in Fig. 5. The arrangement shown in Fig. 12 gives essentially the driving beam shown in Fig. 25 when using filaments 10 and/or 11 in the left headlamp L 9 and filament 11 in the right headlamp R 9. Fig. 13 gives essentially the driving beam shown in Fig. 27 by using filaments 10 and 11 in the left headlamp L 10 and filament 11 in the right headlamp R 10. It also gives essentially a driving beam of the form shown in Fig. 25 when using filament 10 in the left headlamp and filament 11 in the right headlamp. The passing beam of each arrangement is substantially the same as that shown in Fig. 23 and is obtained by the use of filaments 29 in each headlamp. The city beam is substantially the same in each instance and is essentially that shown in Fig. 24 and is produced by the use of filament 29 in the left headlamp and filament 10 in the right headlamp.

What I claim as new and desire to secure by Letters Patent of the United States is:

1. An incandescent lamp comprising a bulb having a plurality of concentrated filaments sealed therein, and a separate circuit connection for each of said filaments, two of said filaments being disposed side by side in substantialy the same plane and on opposite sides of the bulb axis and extending laterally outward from the bulb axis with their inner ends closely adjacent, and a third filament being located directly to one side of said two first-mentioned filaments and being disposed substantially symmetrically about a plane passing through the bulb axis at right angles to the plane of said two first-mentioned filaments.

2. An incandescent lamp comprising a bulb having a plurality of filaments sealed therein, and a separate circuit connection for each of said filaments, two of said filaments being V-shaped and disposed side by side one on each side of the bulb axis to form a W and being located in a plane passing substantially through the said bulb axis, and a third filament being located out of said bulb axis directly to one side of said two first-mentioned filaments and being disposed substantially symmetrically about a plane passing through said bulb axis at right angles to the plane of said two first-mentioned filaments.

3. An incandescent lamp comprising a bulb having a plurality of filaments sealed therein, and a separate circuit connection for each of said filaments, two of said filaments being V-shaped and disposed side by side one on each side of the bulb axis to form a W and being located in a plane passing substantially through the said bulb axis, and a third V-shaped filament being located out of said bulb axis directly to one side of said two first-mentioned filaments in a plane parallel to the plane of said two first-mentioned filaments and being disposed substantially symmetrically about a plane passing through said bulb axis at right angles to the said plane of said two first-mentioned filaments.

4. An incandescent lamp comprising a bulb having a plurality of filaments sealed therein, and a separate circuit connection for each of said filaments, two of said filaments being V-shaped with their apices toward the front of said bulb and disposed side by side one on each side of the bulb axis to form a W and being located in a plane passing substantially through the said bulb axis, and a third rectilinear filament located in a plane passing through said bulb axis at right angles to the plane of said two first-mentioned filaments, said third filament being inclined forwardly with its rearward end adjacent the adjacent ends of said two V-shaped filaments.

5. An incandescent lamp comprising a bulb having a plurality of filaments sealed therein, and a separate circuit connection for each of said filaments, two of said filaments being V-shaped and disposed side by side one on each side of the bulb axis to form a W and being located in a plane passing substantially through the said bulb axis, and a third V-shaped filament located in a plane passing through said bulb axis at right angles to the plane of said two first-mentioned filaments, one end of said third filament being located adjacent the adjacent ends of said two first-mentioned filaments.

VAL J. ROPER.